(12) United States Patent
Nikitin et al.

(10) Patent No.: US 7,054,000 B2
(45) Date of Patent: May 30, 2006

(54) METHOD OF CALIBRATION OF MAGNIFICATION OF MICROSCOPES HAVING DIFFERENT OPERATIONAL PRINCIPLES FOR BRINGING THEM INTO A SINGLE, ABSOLUTE SCALE

(75) Inventors: Arkady Nikitin, Yonkers, NY (US); Albert Sicignano, Mt. Kisco, NY (US); Dmitriy Yeremin, Dobbs Ferry, NY (US); Tim Goldburt, Chappaqua, NY (US)

(73) Assignee: General Phosphorix LLC, Ardsley, NY (US)

( * ) Notice: Subject to any disclaimer, the term of this patent is extended or adjusted under 35 U.S.C. 154(b) by 354 days.

(21) Appl. No.: 10/633,605

(22) Filed: Aug. 4, 2003

(65) Prior Publication Data

US 2005/0030530 A1 Feb. 10, 2005

(51) Int. Cl.
*G01J 1/10* (2006.01)

(52) U.S. Cl. .................................................. 356/243.1
(58) Field of Classification Search ............. 356/243.1
See application file for complete search history.

(56) References Cited

U.S. PATENT DOCUMENTS 5,585,211 A * 12/1996 Firstein et al. ................ 430/30
5,825,670 A * 10/1998 Chernoff et al. .............. 702/85
6,807,314 B1 * 10/2004 Nikitin et al. ............... 250/306
2004/0021075 A1 * 2/2004 Nikitin ....................... 250/307

* cited by examiner

*Primary Examiner*—Gregory J. Toatley, Jr.
*Assistant Examiner*—Kara Geisel
(74) *Attorney, Agent, or Firm*—I. Zborovsky

(57) ABSTRACT

A method of calibration of magnification of a microscope with the use of a diffraction grating has the steps of determining a mean period of a diffraction grating by irradiating the diffraction grating with an electromagnetic radiation having a known wavelength and analyzing a resulting diffraction pattern, determining a scatter of individual values of a period of the diffraction grating by multiple measurements of periods of the diffraction grating by a microscope in pixels in one area in a microscope field of view, and calculating a mean value of the period and the scatter based on the measurements, determining a sufficient number of measurements of the period for providing an accepted statistic error of a magnification of the microscope, performing measurements corresponding to the determined acceptable number of measurements, of individual values of the period in pixels in a plurality of portions of the diffraction grating, calculating a general mean value of the period in pixels based on the immediately preceding step, and finally calculating a parameter corresponding to the magnification of the microscope based on the determined mean value of the period of the diffraction grating in the microscope image and the calculating of the general mean value of the period in pixels.

9 Claims, 3 Drawing Sheets

Flow chart of the sequence of operations of the calibration of magnification

SEM Image of Diffraction Grating

Flow chart of the sequence of operations of the calibration of magnification

View showing an experiment for determination of an average optical period of the diffraction grating with the use of the goniometer 1 is a source of electromagnetic coherent radiation $h\nu$;

2 is diffraction grating; m is the diffraction order; $\theta_m$ is an angle of diffraction for radiation measured which is diffracted in the m order.

METHOD OF CALIBRATION OF MAGNIFICATION OF MICROSCOPES HAVING DIFFERENT OPERATIONAL PRINCIPLES FOR BRINGING THEM INTO A SINGLE, ABSOLUTE SCALE

BACKGROUND OF THE INVENTION

The present invention relates to methods of calibration of magnification of measuring microscopes.

Measuring microscopes are used in different areas of science and industry for measurements of sizes of various objects which have sizes from inches to angstroms. There is no microscope which is capable to measure objects in such a broad range of sizes. For measurements in centimeter, millimeter and micrometer subranges, optical measuring microscopes are the most convenient microscopes. The subrange of micrometer and nanometer sizes is covered by scanning electron measuring microscopes. In the area of nanometer, sub-nanometer and atom (angstrom) sizes, probe microscopes are utilized, such as scanning tunnel microscopes and atomic force microscopes. There are objects with intermediate sizes, which can be measured by microscopes of one type or another type. Typical examples are the features of modern integrating circuits which have submicron and nanometer sizes. These objects can be also measured with scanning electron microscopes or probe microscopes, depending on the nature and properties of the features to be measured. In these cases it is in principl important that the results of measurement of the same object be identical, regardless of the type of microscope which is used for the measurements. The required coincidence of the results of measurements can be provided only when scales of magnification of all used microscopes are coordinated with one another, and ratios of such scales are established with a high accuracy.

This problem is very difficult to solve since there is no universal calibrating standard which would be suitable for calibration of optical measuring microscopes, scanning electron measuring microscopes and probe microscopes. For example the probe microscopes, due to their exceptionally high resolution, are calibrated with the use of a reference sample which is created by nature, in particular a pattern of atoms on the surface of monocrystals. This reference sample is however completely unsuitable for calibration of optical measuring microscopes and scanning electron measuring microscopes, since the resolution of the microscopes of this types is lower than required for visualization of the atom pattern, so that this pattern is not shown on the images of the microscopes of these two types and can not serve as a common standard.

Known attempts to use as a universal reference sample so-called "hand-made" objects have not been successful. U.S. Pat. No. 5,825,670 formally declares a possibility of use of a conventional diffraction grating as a reference sample for the probe microscope. However, it is stated in the patent that the topography of the grating must be preliminarily (in other words before calibration of the microscopes) determined with high accuracy. The reference does not however mention any method of characterization (i.e. measurement) of the topography of the diffraction grating. For such measurements, in turn, it is necessary to have a microscope which is preliminarily precisely calibrated. Therefore the possibility of use of diffraction grating as a reference sample for the probe microscope which is mentioned in this reference is just a declaration without a specific support. The obstacle in this approach is that the diffraction grating to be used can never be completely uniform: the pitch of the diffraction grating does not remain constant and it somewhat changes from one point of observation to another. This causes non-reproducibility of the calibration and significantly reduces its accuracy.

Coordination of scales of magnification of microscopes of any type can be provided only if all of the microscopes are calibrated in a single, absolute scale of sizes.

SUMMARY OF THE INVENTION

Accordingly, it is an object of the present invention to provide a method of calibration of magnification of scanning measuring micro-scopes with digital scan system performed, in absolute units.

In keeping with these objects and with others which will become apparent herein after, one feature of the present invention resides, briefly stated, in a method of calibration of magnification of a microscope with the use of a diffraction grating, comprising the steps of determining a mean period of a diffraction grating by irradiating the diffraction grating with an electromagnetic radiation having a known wavelength and analyzing a resulting diffraction pattern; determining a scattering of individual values of a period (pitch) of the diffraction grating by multiple measurements of periods of the diffraction grating by a microscope in pixels in one area in a microscope field of view, and calculating a mean value of the period and the scatter based on the measurements; determining a sufficient number of measurements of the period for providing an accepted statistic error of a magnification of the microscope; performing measurements corresponding to the determined acceptable number of measurements, of individual values of the period in pixels in a plurality of portions of the diffraction grating; calculating a general mean value of the period in pixels based on the immediately preceding step; and finally calculating a parameter corresponding to the magnification of the microscope based on the determined mean value of the period of the diffraction grating.

When the method is performed in accordance with the present invention, it eliminates the disadvantages of the prior art and provides for the highly advantageous results which will be explained in detail herein below.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
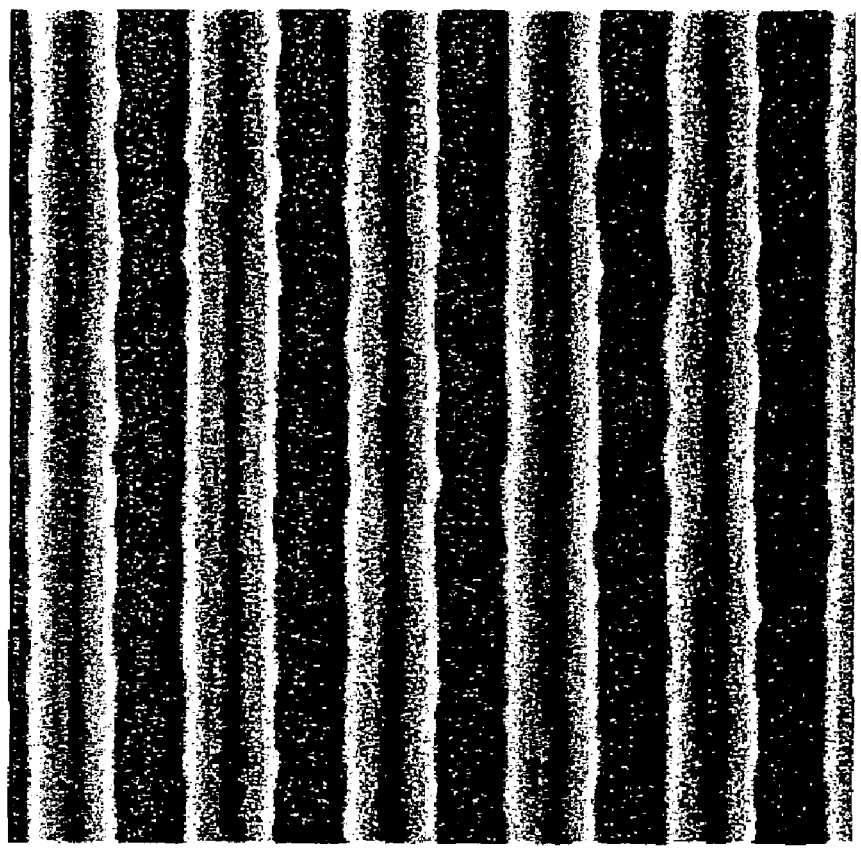
FIG. 1 is a view showing an image of a test diffraction grating in a scanning electron microscope with a magnification 65K, wherein local inhomogenuities of a period or "sample nonuniformity" are clearly shown.

A method of calibration of magnification is illustrated for a measuring optical microscope or a scanning electron microscope or a probe microscope and is performed with the use of a diffraction grating (FIG. 1). The method includes first of all a measurement of a mean "optical" period $T_0$ of the diffraction grating in a standard difractometric experiment, for example in accordance with the formula:

$$T_0 = \frac{m\lambda}{\sin\theta_m}$$

wherein m is an order of diffraction, $\lambda$ is a wavelength of a used mono-chromatic radiation which is known with a high accuracy, and $\theta_m$ is an angle of diffraction measured in the experiment for the radiation which is diffracted in the m order.

Then scatter $\omega$ of individual values of periods of the test diffraction grating is determined. For this purpose multiple measurements of the period $T_i$ with one of the known methods are performed. It is performed on images of different individual periods of the diffraction grating which are selected randomly, with their positioning in the same selected field of view of the microscopes, for example in its center. Then a preliminary mean value of the period $T_{AVE}$ and a scatter $\omega$ are determined in accordance with the formulas:

$$T_{AVE} = \frac{\sum_{i=1}^{N} T_i}{N}$$

$$\omega = \sqrt{\frac{\sum_{i=1}^{N}(T_i - T_{AVE})}{N}},$$

wherein i is a number of the measurement, $T_i$ is an individual period value, N is a number of performed preliminarily measurements (usually 10–20). The values $T_{AVE}$ and $\omega$ are measured in pixels.

The next step is determination of a sufficient number K of independent measurements of the period for providing the required statistic error $\sigma$ of magnification of the microscope in accordance with the following formula $$K \geq \left(\frac{\omega}{\sigma T_{AVE}}\right)^2$$

Based on the images obtained in the microscope to be calibrated, K of independent measurements of individual values of the period $T_i$ in pixels are performed. If the preliminary multiple measurements of the period were performed on the microscope to be attested, then the K measurements can include the results of the measurements performed during the preliminary step.

Thereafter a general mean value of the period in pixels is determined in accordance with the formula:

$$T_{GEN} = \frac{\sum_{i=1}^{K} T_i}{K}$$

The scale of magnification MAG of the microscope to be attested in the selected zone of its field of view is calculated:

$$MAG = \frac{L * T_{GEN}}{Q * T_0}$$

wherein L is a width of the screen (picture) on which a magnified image is observed, and Q is a number of pixels in a line.

In the practice of measurements with the use of a digital measuring microscope, instead of the magnification MAG often a different parameter is utilized, namely a distance between "elements of breaking" of the image, or in other words pixels. Pixel length is PL. This characteristic is calculated from the results of the measurements performed in the previous steps in accordance with the following formula:

$$PL = \frac{T_0}{T_{GEN}}$$

All actions which are performed for the calibration of magnification in accordance with the present invention can be subdivided into three independent blocks.

Figure 2:
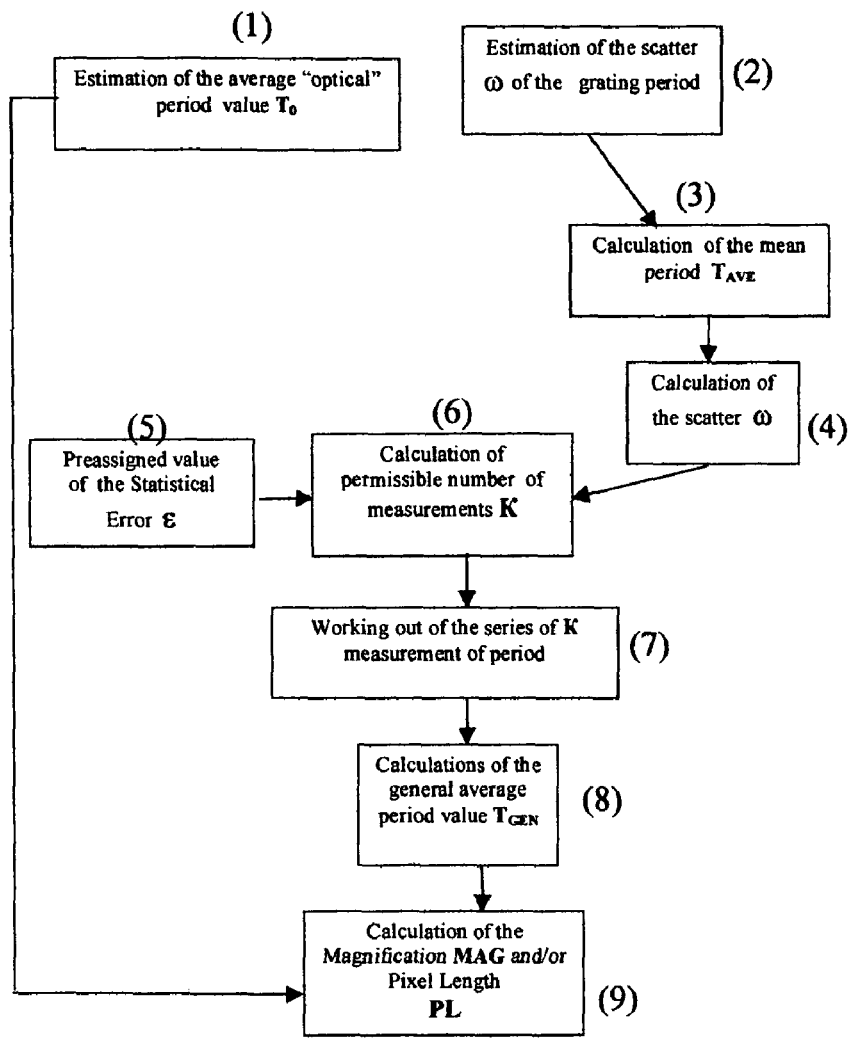
FIG. 2 is a view showing a sequence of operations of the calibration of magnification in accordance with the present invention, wherein first operation is performed on optical goniometer while the other operations are performed in a microscope to be calibrated.
Figure 3:
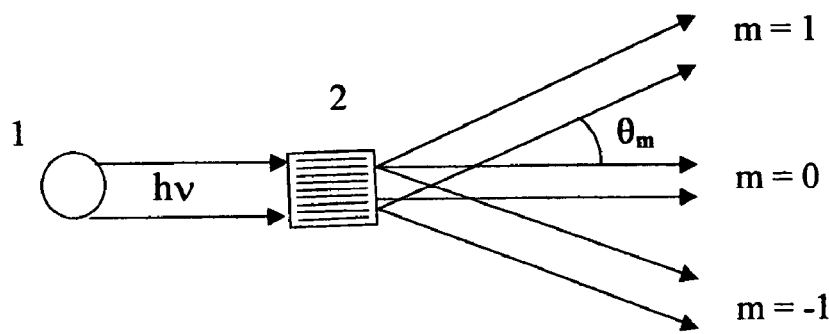
FIG. 3 is a view showing an experiment for determination of an average optical period of the diffraction grating with the use of the goniometer.

The determination of the average "optical" period of the diffraction grating in absolute units. This operation which is identified as 1 in FIG. 2 is performed with the use of an optical goniometer and not related in time and place to other operations. Modern optical goniometers allow to determine an angle of diffraction with an error of several angular seconds: (2÷5)". With the measurements of the angle of diffraction in the range of 40–60°, a relative error of measurement of the angle $\theta_m$ corresponds to approximately $1 \cdot 10^{-5}$. The wavelengths of some spectral lines which are suitable for performing a diffractometric experiment is known with the error of approximately $2 \cdot 10^{-7}$. This allows to calculate a mean (optical) value of the period of diffraction grating $T_0$ in absolute units with error of a few thousands of a percent. FIG. 2 shows a source of a monochromatic radiation 1, a stage of the goniometer with the diffraction grating 2 attached to it, and a counting device for measurement of an angle of diffraction $\theta_m$ which is not shown in the drawings since it is not important for the present invention.

The next group of operations is performed in a microscope to be calibrated. For achieving the final objective which is a precision calibration of magnification of the microscope, it is necessary to compare $T_0$ with the general mean value of the period measured on the microscope in pixels $T_{GEN}$. This mean value is calculated by standard method with the use of statistical rules. The number of the independent results of the individual measurements K which is involved in calculation of the general mean value depends on the quality of the diffraction grating, in particular on scatter $\omega$ of the results of individual measurements around the mean value $T_{AVE}$ and also on the required accuracy of the calibration σ. The connection of this variables with the number of measurements K is shown in the formula presented herein above. For calculation of the scatter ω and the required number of measurements K operations 3, 4, and 6 are identified in FIG. 2.

The last group of the operations is also performed in the microscope to be calibrated and includes performance of a series of K independent measurements of the period which is operation 7, a calculation of the general mean value $T_{GEN}$ which is operation 8, and a calculation of scale of magnification MAG and a length of pixel PL which is operation 9.

In accordance with the theory of probability, an average square probable error of calibration includes probable errors of all operations performed during the process of calibration. An evaluation of possible errors of the procedures shown in FIG. 2 can be performed in the following manner.

A. Relative error of the wavelength of the use of monochromatic radiation usually does not exceed $2 \cdot 10^{-7}$.

B. Error of detection of the angle of diffraction $\theta_m$ is taken here to be equal to 2 angular seconds, which corresponds to a relative error of determination of $T_0$ about $1 \cdot 10^{-5}$.

C. If it is established that the scatter of the individual values of the period of diffraction grating ω is 1.5% and the calculated value K is equal to 5000, then the probable error of calculation of the general mean period $T_{GEN}$ is:

$$\varepsilon = \frac{0.015}{\sqrt{5000}} \cong 2 \cdot 10^{-4}$$

Full probable error of calibration of magnification can now be presented as follows:

$$\sigma = \sqrt{(2 \cdot 10^{-7})^2 + (1 \cdot 10^{-5})^2 + (2 \cdot 10^{-4})^2} \approx 0.02\%,$$

Thus it can be qualified as a precision calibration of magnification.

The connection to absolute units of lengths is performed due to the use of monochromatic radiation, with the wavelength λ as shown in the above presented formula, which is known with the high accuracy in absolute units.

It will be understood that each of the elements described above, or two or more together, may also find a useful application in other types of constructions differing from the types described above. While the invention has been illustrated and described as embodied in a method of calibration of magnification of microscopes having different operational principles for bringing them to a single, absolute scale, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method of calibration of magnification of a microscope with the use of a diffraction grating, comprising the steps of determining a mean period of a diffraction grating by irradiating the diffraction grating with an electromagnetic radiation having a known wavelength and analyzing a resulting diffraction pattern; determining a scatter of individual values of a period of the diffraction grating by multiple measurements of periods of the diffraction grating by a microscope in pixels in one area in a microscope field of view; calculating a mean value of the period and the scatter based on the measurements; determining a sufficient number of measurements of the period for providing an accepted statistic error of a magnification of the microscope; performing measurements corresponding to the determined acceptable number of measurements, of individual values of the period in pixels in a plurality of portions of the diffraction grating; calculating a general mean value of the period in pixels based on an immediately preceding step; and finally calculating a parameter corresponding to the magnification of the microscope based on the determined mean value of the period of the diffraction grating.

2. A method as defined in claim 1, wherein said calculation of the parameter includes calculation of a value of the magnification of the microscope.

3. A method as defined in claim 1, wherein said calculation of the parameter includes calculation of a pixel length of the microscope.

4. A method as defined in claim 1, wherein said determining of a mean period of the diffraction grating is preformed in accordance with the formula:

$$T_0 = \frac{m\lambda}{\sin\theta_m}$$

wherein m is an order of diffraction, λ a wavelength of a used monochromatic radiation which is known with high accuracy, $\theta_m$ is an angle of diffraction for radiation measured which is diffracted in the m order.

5. A method as defined in claim 4, wherein said determining of the mean value of the period $T_{AVE}$ and determining of the scatter ω is performed in accordance with the formulas:

$$T_{AVE} = \frac{\sum_{i=1}^{N} T_i}{N}$$

$$\omega = \sqrt{\frac{\sum_{i=1}^{N}(T_i - T_{AVE})}{N}},$$

wherein i is the number of measurement, N is a number of performed preliminary measurements, $T_i$ is an individual period value, and $T_{AVE}$ $T_i$ and ω are measured in pixels.

6. A method as defined in claim 5, wherein said determining of the sufficient number of measurements is performed in accordance with the formula:

$$K \geq \left(\frac{\omega}{\sigma T_{AVE}}\right)^2$$

where σ is the acceptable calibration error.

7. A method as defined in claim 6, wherein said calculation of the general mean value of the periods is performed in accordance with the formula:

$$T_{GEN} = \frac{\sum_{i=1}^{K} T_i}{K}.$$

8. A method as defined in claim 7, wherein said determination of the magnification is performed in accordance with the formula:

$$MAG = \frac{L * T_{GEN}}{Q * T_0}$$

wherein L is a width of a screen on which a magnified image is observed, and Q is a number of pixels in a line.

9. A method as defined in claim 8, wherein the determination of the pixel length is performed in accordance with the formula:

$$PL = \frac{T_0}{T_{GEN}}$$

* * * * *